(12) United States Patent
Jiang et al.

(10) Patent No.: US 10,760,767 B2
(45) Date of Patent: Sep. 1, 2020

(54) ILLUMINATING LENS DESIGN METHOD AND ILLUMINATING LENS

(71) Applicant: Yejia Optical Technology (Guangdong) Corporation, Dongguan, Guangdong (CN)

(72) Inventors: Cheng Jiang, Dongguan (CN); Jun She, Dongguan (CN); Jixue Nan, Dongguan (CN)

(73) Assignee: YEJIA OPTICAL TECHNOLOGY (GUANGDONG) CORPORATION, Dongguan (CN)

( * ) Notice: Subject to any disclaimer, the term of this patent is extended or adjusted under 35 U.S.C. 154(b) by 404 days.

(21) Appl. No.: 15/621,273

(22) Filed: Jun. 13, 2017

(65) Prior Publication Data

US 2018/0266653 A1    Sep. 20, 2018

(30) Foreign Application Priority Data

Mar. 16, 2017 (CN) .......................... 2017 1 0156802

(51) Int. Cl.
*G02B 3/00* (2006.01)
*G02B 25/00* (2006.01)
*F21V 5/04* (2006.01)
*G02B 27/00* (2006.01)
*F21Y 115/10* (2016.01)

(52) U.S. Cl.
CPC .............. *F21V 5/04* (2013.01); *G02B 3/0037* (2013.01); *F21Y 2115/10* (2016.08); *G02B 27/0012* (2013.01); *G02B 27/0062* (2013.01)

(58) Field of Classification Search
CPC ......... G02B 3/00; G02B 25/001; G02B 7/027
USPC ....................................... 359/642, 643, 664
See application file for complete search history.

*Primary Examiner* — Dawayne Pinkney
(74) *Attorney, Agent, or Firm* — Locke Lord LLP; Tim Tingkang Xia, Esq.

(57) ABSTRACT

An illuminating lens design method and an illuminating lens. The projections of the highest points of an outer surface and an inner cavity surface of the illuminating lens on the horizontal plane are overlapped, and a horizontal profile curve of the outer surface and the inner cavity surface of the illuminating lens obtained from an arbitrary height satisfies:

$$\left(\frac{|x_i|}{a_i}\right)^{n_i} + \left(\frac{|y_i|}{b_i}\right)^{n_i} = 1$$

where ai is the projection length of a portion of an xz section basic profile curve, which is intercepted by an xiyi plane, on the xiyi plane; bi is the projection length of a portion of a yz basic profile curve, which is intercepted by the xiyi plane, on the xiyi plane; xi, yi are coordinates of certain point on the outer horizontal profile curve and the inner horizontal profile curve; ni is a real number greater than 1.

6 Claims, 6 Drawing Sheets

ILLUMINATING LENS DESIGN METHOD AND ILLUMINATING LENS

CROSS-REFERENCE TO RELATED APPLICATIONS

This application claims priority to and the benefit of, pursuant to 35 U.S.C. § 119(a), patent application Serial No. CN201710156802.5 filed in China on Mar. 16, 2017. The disclosures of the above application are incorporated herein in their entireties by reference.

FIELD OF THE INVENTION

The present invention relates to a lens, and more particularly, to an illuminating lens design method and an illuminating lens designed by using the same.

BACKGROUND OF THE INVENTION

LED is an environment-friendly and reliable light source owing to its luminous efficiency, low power consumption, long service life and safety, and is widely used in various fields of display illumination. An LED chip must use a lens for light distribution in general.

The existing LED lens is mostly a rotationally symmetrical circular lens, which presents a circular light spot. This circular lens has only one dimension of freedom in light distribution. And some of the producers produce an oval lens by performing unequally proportional stretching and compression on an outer surface and a cavity surface of the circular lens in the two horizontal directions x, y. This simple change in the two dimensions on the horizontal plane has limited control of light and not high enough degree of freedom in light control, and the design of the formed light spot is limited.

SUMMARY OF THE INVENTION

An objective of the present invention is to provide an illuminating lens design method and an illuminating lens obtained by using the same in view of the above-mentioned problems raised in the prior art. The illuminating lens provided by the present invention is capable of controlling the size of the lens from three dimensions and has good light control capability.

The illuminating lens design method provided by the present invention comprises the following steps:

(1) designing two rotationally symmetrical circular lenses in a rectangular coordinate system, each of the circular lenses including an inner cavity surface with a downward opening, and the outer surfaces of and the inner cavity surfaces of the two circular lenses being identical in height;

(2) intercepting a section basic profile curve of one circular lens by an XZ plane, intercepting a section basic profile curve of the other circular lens by a YZ plane, and placing the two section basic profile curves in the same rectangular coordinates, such that the vertexes of the two section basic profile curves are coincided, and the reference heights at the bottoms of the two section basic profile curves are identical;

(3) taking a Zi value on the rectangular coordinates to obtain a corresponding $x_i y_i$ plane, and acquiring an outer horizontal profile curve and an inner horizontal profile curve on the $x_i y_i$ plane, wherein a group of outer horizontal profile curves are combined into the outer surface of the lens, a group of inner horizontal profile curves are combined into the inner cavity surface of the lens, and both the outer horizontal profile curve and the inner horizontal profile curve satisfy the following equation:

$$\left(\frac{|x_i|}{a_i}\right)^{n_i} + \left(\frac{|y_i|}{b_i}\right)^{n_i} = 1$$

Wherein, ai is the projection length of a portion of an xz section basic profile curve, which is intercepted by an xiyi plane, on the xiyi plane; bi is the projection length of a portion of a yz basic profile curve, which is intercepted by the xiyi plane, on the xiyi plane; xi, yi are coordinates of certain point on the outer horizontal profile curve and the inner horizontal profile curve; ni is a real number greater than 1.

The present invention further provides an illuminating lens, comprising an inner cavity surface with a downward opening, wherein the projections of the highest points of the outer surface and the inner cavity surface of the illuminating lens on the horizontal plane are overlapped, and in a rectangular coordinate system, a horizontal profile curve of the outer surface and the inner cavity surface of the illuminating lens obtained from arbitrary height satisfies the following equation:

$$\left(\frac{|x_i|}{a_i}\right)^{n_i} + \left(\frac{|y_i|}{b_i}\right)^{n_i} = 1$$

Wherein, ai is the projection length of a portion of an xz section basic profile curve, which is intercepted by an xiyi plane, on the xiyi plane; bi is the projection length of a portion of a yz basic profile curve, which is intercepted by the xiyi plane, on the xiyi plane; xi, yi are coordinates of certain point on the outer horizontal profile curve and the inner horizontal profile curve; ni is a real number greater than 1.

Preferably, ni on the outer surface or inner surface of the same lens satisfies $n_{imax} - n_{imin} \leq 6$.

Preferably, in case that $a_i > 0.6$ and $b_i > 0.6$, $$0.2 < \frac{a_i}{b_i} < 5.$$

In one embodiment, a lens holder is provided at the bottom of the lens and provided with a through hole communicating with the inner cavity surface, and the through hole is in smooth transition with the inner cavity surface. A plurality of support legs are provided at the bottom of the lens holder.

Three variables $a_i$, $b_i$ and $n_i$ of the illuminating lens can be obtained by using the design method disclosed by the present invention, such that the sizes of the outer surface and the inner cavity surface of the lens can be designed from three dimensions, the degree of freedom in light distribution of the lens can be improved, and transparent multi-dimensional asymmetric light distribution and favorable light distribution control capability can be realized to adapt to different application requirements.

Figure 1:
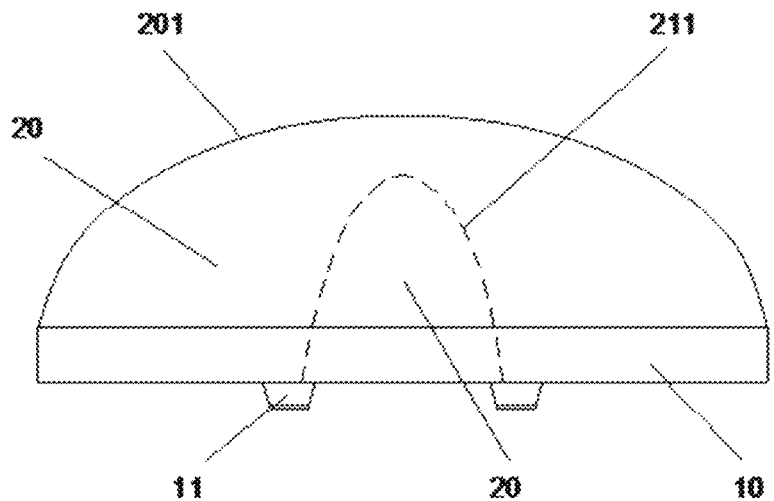
FIG. 1 is a structural schematic drawing of the illuminating lens of the present invention.

The reference signs are as follows: lens holder 10; lens leg 11; lens 20; outer surface 201; inner cavity 21; inner cavity surface 211; outer horizontal profile curve 30; inner horizontal profile curve 30'.

DETAILED DESCRIPTION OF THE INVENTION

The present invention will be described in further detail with reference to the accompanying drawings and specific embodiments in order to provide a further understanding of the features, technical means and specific objects and functions attained by the present invention.

As shown in FIG. 1, an illuminating lens disclosed by the present invention comprises a lens holder 10 and a lens 20 mounted on the lens holder, wherein the lens 20 internally provided with an inner cavity 21 with a downward opening, the lens holder 10 is provided with a through hole, and the inner cavity 21 is in communication and smooth transition with the through hole in the lens holder 10. The lens 20 comprises an outer surface 201 and an inner cavity surface 211.

Figure 3:
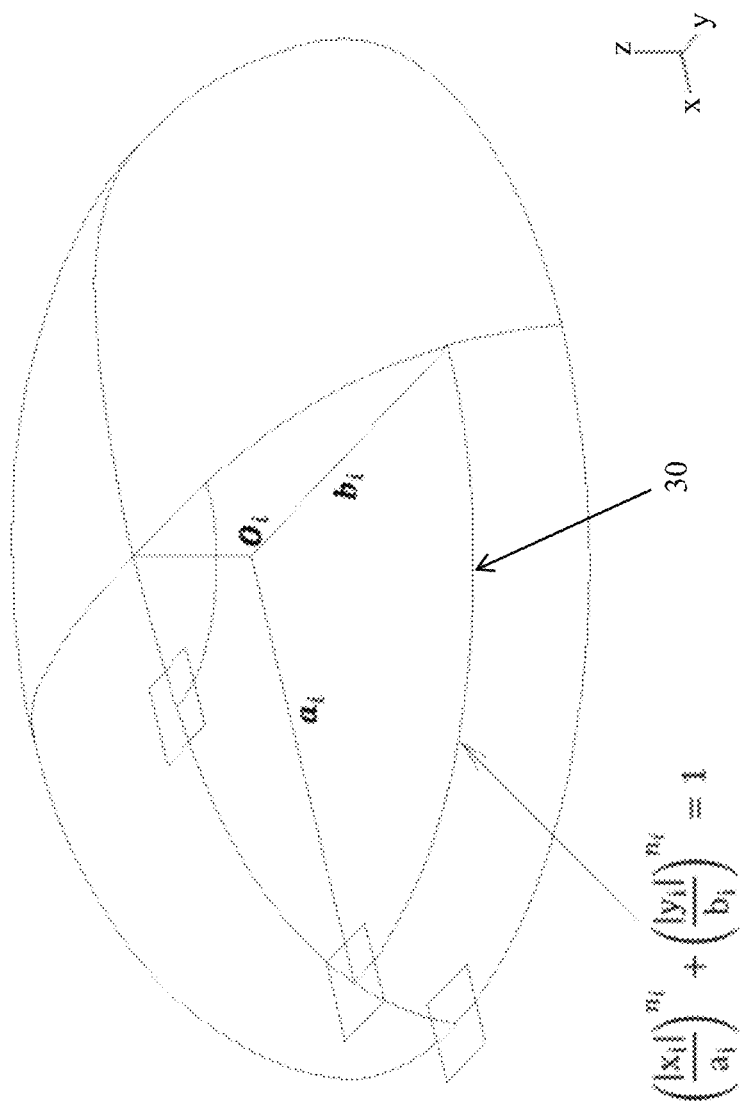
FIG. 3 is a schematic drawing of the outer surface of the illuminating lens of the present invention.
Figure 4:
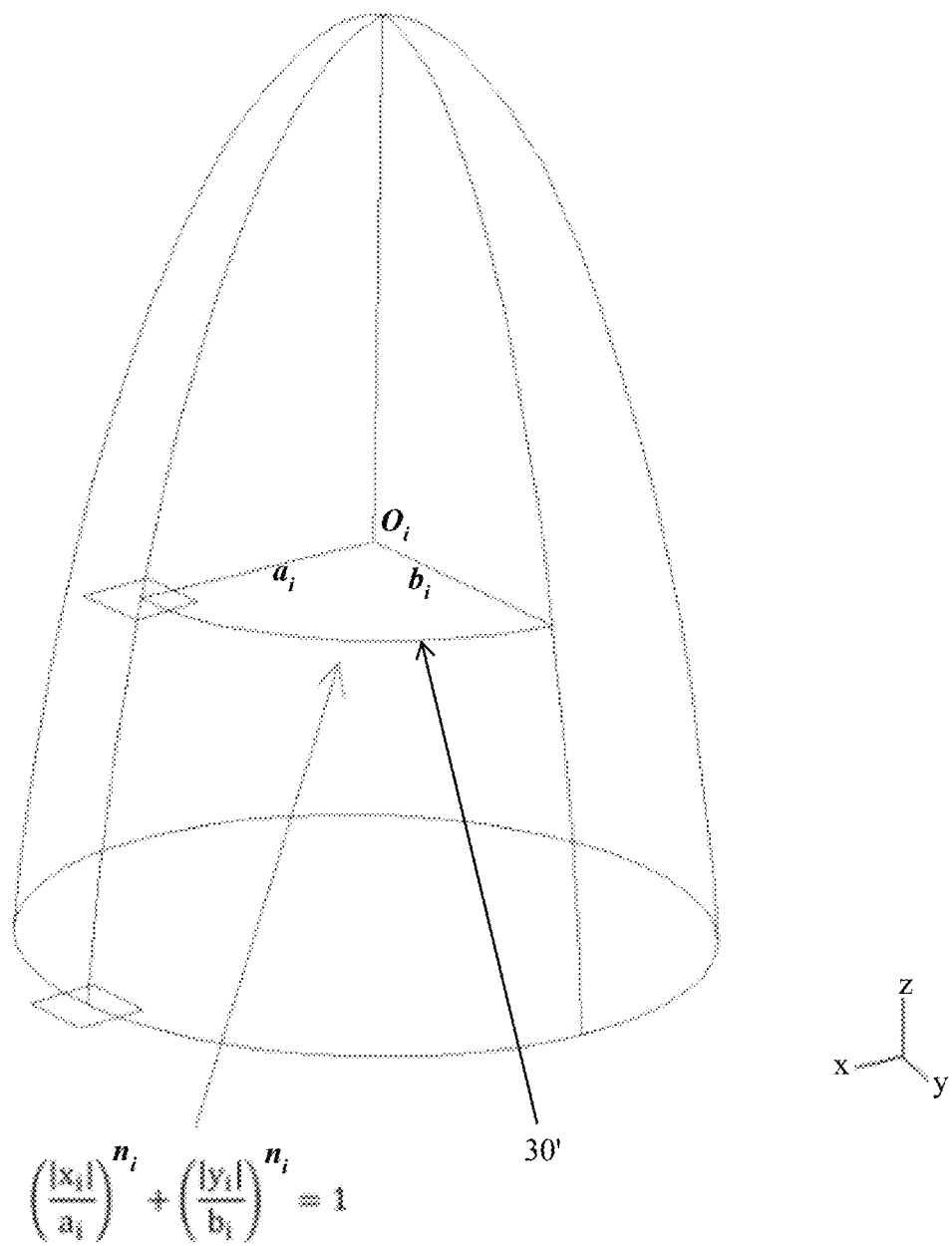
FIG. 4 is a schematic drawing of the inner cavity surface of the illuminating lens of the present invention.

As shown in FIGS. 3 and 4, an illuminating lens design method provided by the present invention comprises the following steps:

(1) designing two rotationally symmetrical circular lenses in a rectangular coordinate system, each of the circular lenses including an inner cavity surface with a downward opening, and the outer surfaces of and the inner cavity surfaces of the two circular lenses being identical in height;

(2) intercepting a section basic profile curve of one circular lens by an XZ plane, intercepting a section basic profile curve of the other circular lens by a YZ plane, and placing the two section basic profile curves in the same rectangular coordinates, such that the vertexes of the two section basic profile curves are coincided, and the reference heights at the bottoms of the two section basic profile curves are identical;

The xy plane is a horizontal projection plane of the lens, and z direction is a central light outgoing direction of the LED.

(3) taking a Zi value on the rectangular coordinates to obtain a corresponding $x_i y_i$ plane, acquiring an outer horizontal profile curve 30 and an inner horizontal curve 30' on the $x_i y_i$ plane, wherein both the outer horizontal profile curve and the inner horizontal profile curve satisfy the following equation:

$$\left(\frac{|x_i|}{a_i}\right)^{n_i} + \left(\frac{|y_i|}{b_i}\right)^{n_i} = 1$$

wherein, ai>0, bi>0, ni>1, and $a_i$, $b_i$ and $n_i$ are real numbers. That is, the intersecting line of the arbitrary plane and the transparent outer surface or the inner cavity surface satisfies the above formula, wherein the horizontal coordinate system of this plane is designed as xiyi plane, in which the origin 0i is a projection point of the high point in the center of the lens on this plane; ai is the projection length of a portion of a profile curve on the xz plane, which is intercepted by an xiyi plane, on the xiyi plane; bi is the projection length of a portion of a profile curve on the yz plane, which is intercepted by the xiyi plane, on the xiyi plane; xi, yi are coordinates of certain point on the outer horizontal profile curve and the inner horizontal profile curve.

By calculating the outer horizontal profile curve 30 and the inner horizontal profile curve 30' under different z values, all the outer horizontal profile curves 30 are combined into the outer cavity surface 201, and all the inner horizontal profile curves 30' are combined into the inner cavity surface 211.

ni may be taken as: ni=1.5; ni=2; ni=2.5; ni=5.4858. The difference between ni maximum and ni minimum is less than 6.0 on the outer surface or inner surface of the same lens.

In case that $a_i$>0.6 and $b_i$>0.6, $$0.2 < \frac{a_i}{b_i} < 5.$$

The desired lens 20 is designed by using the above-described method, and an LED chip is placed at the bottom of the inner cavity 21, and the light emitted from the LED chip is refracted through the inner cavity surface 211 to realize light distribution, and the formed light is then emitted by the outer surface 201. The light is subjected to secondary light distribution by the outer surface 201 to further strengthen the control of light distribution, and therefore the light distribution can be effectively controlled to meet the requirements.

Figure 2:
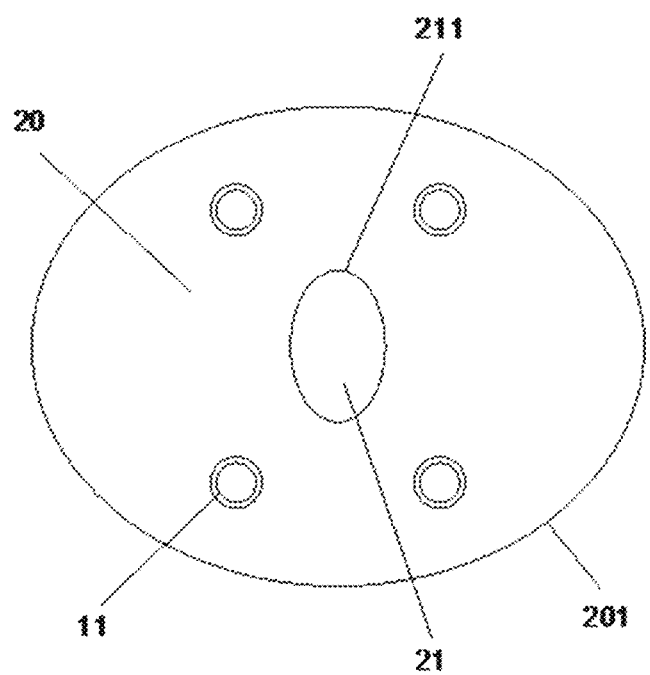
FIG. 2 is a schematic drawing of the bottom of the illuminating lens as shown in FIG. 1.

In order to enhance the stability of the lens 20, a plurality of lens legs 11 is provided at the bottom of the lens holder 10, and preferably, as shown in FIG. 2, four lens legs 11 are evenly distributed.

Figure 5:
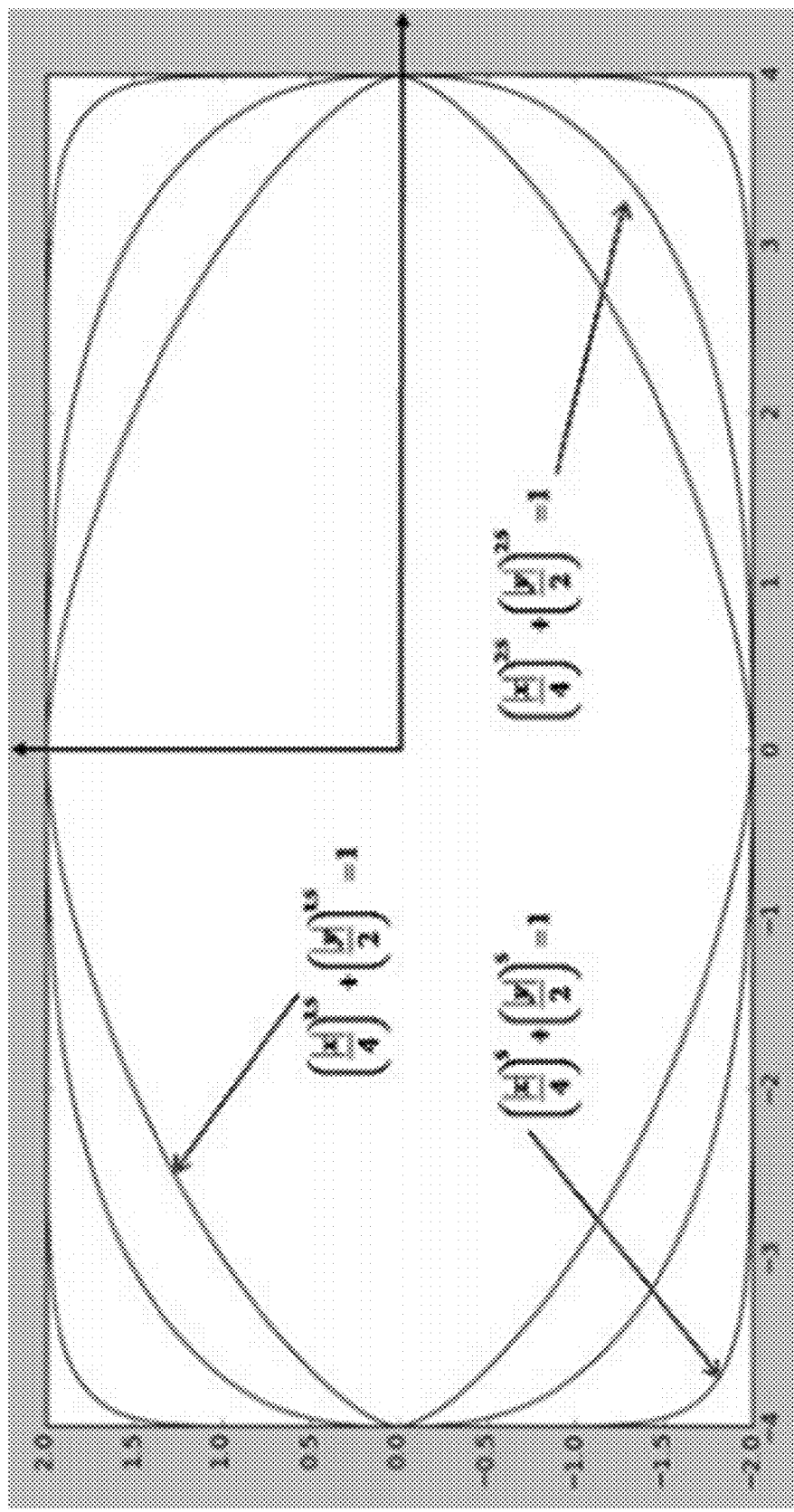
FIG. 5 is an equation curve schematic drawing of the profile curve of the present invention.

FIG. 5 is a curve graph of $$\left(\frac{|x_i|}{a_i}\right)^{n_i} + \left(\frac{|y_i|}{b_i}\right)^{n_i} = 1.$$

In case that a ratio of $a_i$ to $b_i$ is a constant, the larger the value of $n_i$ is, the more plump the horizontal profile curve is. When the horizontal profile curve is the outer horizontal profile curve 30, a light spot formed by light distribution is more plump; when the horizontal profile curve is the inner horizontal profile curve 30', on the contrary, the light spot formed by light distribution is less plump, and therefore the plumpness degree of the light spot is controlled by controlling the value of $n_i$.

Figure 6:
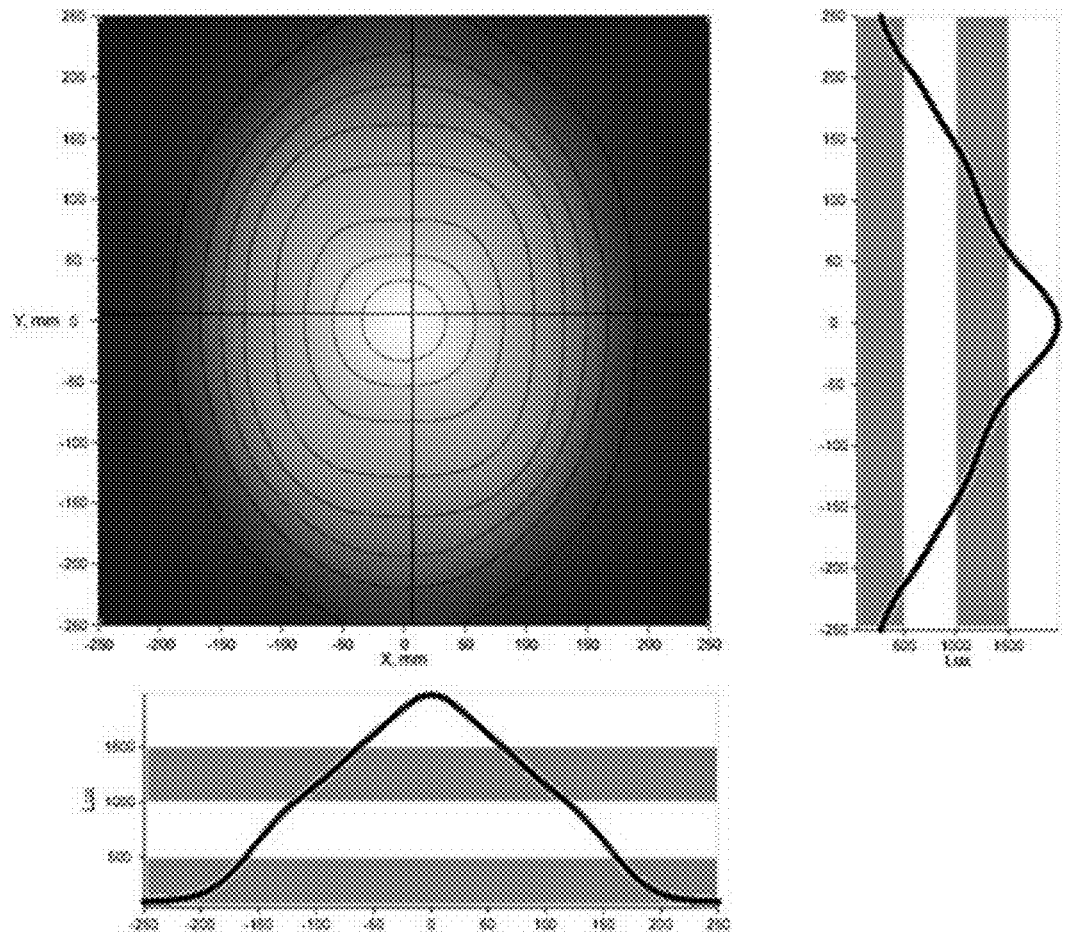
FIG. 6 is an equiluminous distribution diagram formed by single illuminating lens of the present invention.

FIG. 6 is an equiluminous distribution diagram formed by a single lens. The illuminating lens manufactured by using the method provided by the present invention can form irregular light spots, and the distribution of light penetrating through the illuminating lens can be controlled in three dimensions, and the degree of freedom is significantly improved.

Figure 7:
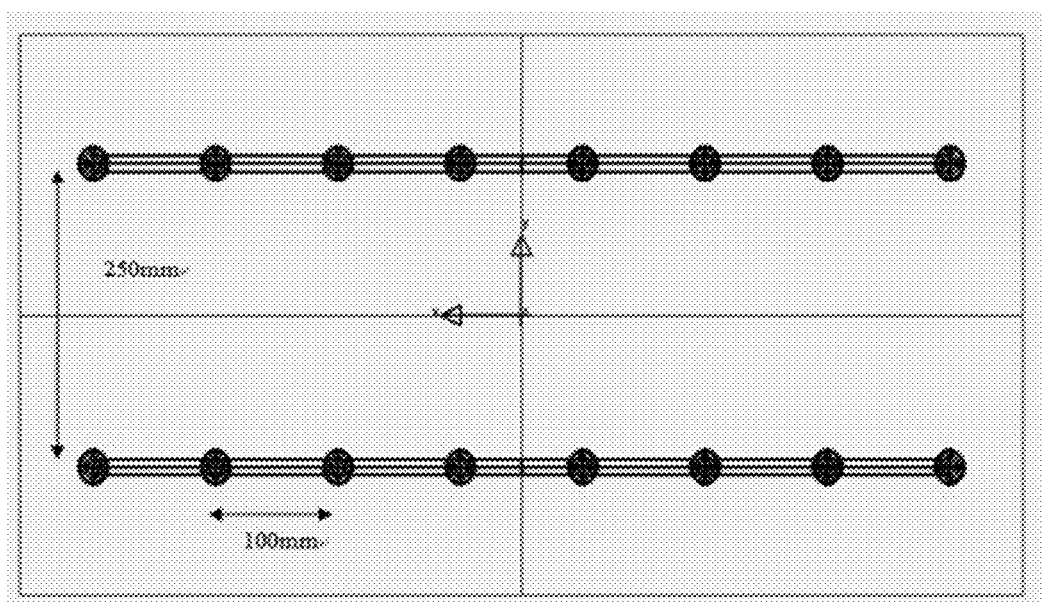
FIG. 7 is a schematic drawing of application of the lens formed in the present invention to TV backlight.

FIG. 7 is a schematic drawing of 50-inch television backlight consisting of the illuminating lens formed by using the method of the present invention in combination with the LED chip. A single illuminating lens forms a rectangular light spot with a span of 250 mm in a y-axis direction and a span of 100 mm in an x-axis direction in combination with the LED chip. The illuminating lenses are arranged in a distance of 100 mm in the x-axis direction and 250 mm in the y-axis direction.

In Embodiment 1, according to $$\left(\frac{|x_i|}{a_i}\right)^{n_i} + \left(\frac{|y_i|}{b_i}\right)^{n_i} = 1,$$

with respect to the inner cavity surface 211, $a_i = b_i$ is taken and different $n_i$ values are set, such that different inner horizontal profile curves 30' are formed under different z values. The outer cavity surface 201 is formed in the same way. The outer horizontal profile curve 30 formed by the outer surface 201 is rotationally symmetric, and the inner horizontal profile curve 30' formed by the inner cavity surface 211 is also rotationally symmetrical. After the light emitted from the LED chip passes through the inner cavity surface 211, due to setting of different $n_i$ values, the plumpness degree of the formed light spot can be adjusted. In a similar way, the plumpness degree of the light spot formed by the light emitted from the LED chip through the outer surface 201 is also controlled, so that the integrally formed illumination lens can be subjected to light distribution against the plumpness degree of the light spot.

In Embodiment 2, according to $$\left(\frac{|x_i|}{a_i}\right)^{n_i} + \left(\frac{|y_i|}{b_i}\right)^{n_i} = 1,$$

with respect to the inner cavity surface 211, $a_i > b_i$ is taken and different $n_i$ values are set, such that the inner horizontal profile curve 30' of the inner cavity surface 211 is formed under different z values, the size of the inner cavity surface 211 on three dimensions can be controlled, and the degree of freedom in light distribution can be enhanced; with respect to the outer surface 201, $a_i < b_i$ is taken and different $n_i$ values can be set, such that the outer horizontal profile curve 30 of the outer surface 201 is formed under different z values, the size of the outer surface 201 on three dimensions can be controlled, and the degree of freedom in light distribution can be enhanced. The outer horizontal profile curve 30 formed by the outer surface 201 is rotationally asymmetric, and the inner horizontal profile curve 30' formed by the inner cavity surface 211 is also rotationally asymmetrical. After the light emitted from the LED chip passes through the cavity face 211, the formed light spot is stretched in the x dimension, then passes through the outer surface 201 and is then stretched in the y direction, and the finally formed light spot is rectangular.

In Embodiment 3, with respect to the inner cavity surface 211, $a_i > b_i$ is taken and different $n_i$ values are set, such that the inner horizontal profile curve 30' of the inner cavity surface 211 is formed under different z values, the size of the inner cavity surface 211 on three dimensions can be controlled, and the degree of freedom in light distribution can be enhanced; with respect to the outer surface 201, $a_i = b_i$ is taken and different $n_i$ values can be set, such that the outer horizontal profile curve 30 is formed under different z values. The outer horizontal profile curve 30 formed by the outer surface 201 is rotationally symmetric, and the inner horizontal profile curve 30' formed by the inner cavity surface 211 is also rotationally symmetrical. After the light emitted from the LED chip passes through the inner cavity face 211, the formed light spot is stretched in the x dimension, and then passes through the outer surface 201, the light spot changes only in the plumpness degree, and the finally formed light spot is rectangular.

In Embodiment 4, with respect to the inner cavity surface 211, $a_i = b_i$ is taken and different $n_i$ values are set, such that the inner horizontal profile curve 30' is formed under different z values; with respect to the outer surface 201, $a_i > b_i$ is taken and different $n_i$ values can be set, such that the profile curve 30 of the outer surface 201 is formed under different z values, the size of the outer surface 201 on three dimensions can be controlled, and the degree of freedom in light distribution can be enhanced. The outer horizontal profile curve 30 formed by the outer surface 201 is rotationally symmetric, and the inner horizontal profile curve 30' formed by the inner cavity surface 211 is also rotationally symmetrical. After the light emitted from the LED chip passes through the inner cavity surface 211, the formed light spot changes only in the plumpness degree, then passes through the outer surface 201 and is then stretched in the x dimension, and the finally formed light spot is rectangular.

The lens produced by the method of the present invention can effectively control the light distribution capability of the illuminating lens and can significantly improve the degree of freedom in light distribution, so that the light emitted from the LED chip can be controlled by the illuminating lens manufactured by using method in three dimensions, and the shape of the design light spot is almost unrestricted.

The embodiments described above are merely illustrative of several embodiments of the present invention and are more specific and detailed, but are not to be construed as limiting the scope of the present invention. It should be noted that, for those skilled in the art, several deformations and variations made without departing from the concept of the present invention will fall into the protection scope of the claims of the present invention.

What is claimed is:

1. An illuminating lens, comprising an inner cavity surface with a downward opening and an outer surface, wherein projections of the highest points of the outer surface and the inner cavity surface of the illuminating lens on the horizontal plane are overlapped, and in a rectangular coordinate system, a horizontal profile curve of the outer surface and the inner cavity surface of the illuminating lens obtained from arbitrary height satisfies the following equation:

$$\left(\frac{|x_i|}{a_i}\right)^{n_i} + \left(\frac{|y_i|}{b_i}\right)^{n_i} = 1$$

where ai is the projection length of a portion of an xz section basic profile curve, which is intercepted by an xiyi plane, on the xiyi plane; bi is the projection length of a portion of a yz basic profile curve, which is intercepted by the xiyi plane, on the xiyi plane; xi, yi are coordinates of certain point on the outer horizontal profile curve and the inner horizontal profile curve; ni is a real number greater than 1.

2. The illuminating lens according to claim 1, wherein ni on the outer surface or the inner cavity surface of the same lens satisfies $n_{imax}\ n_{imin} \le 6$.

3. The illuminating lens according to claim 1, wherein, in case that $a_i > 0.6$ and $b_i > 0.6$, $$0.2 < \frac{a_i}{b_i} < 5.$$

4. The illuminating lens according to claim 1, wherein a lens holder is provided at the bottom of the lens and provided with a through hole communicating with the inner cavity surface, and the through hole is in smooth transition with the inner cavity surface.

5. The illuminating lens according to claim 4, wherein a plurality of support legs is provided at the bottom of the lens holder.

6. An illuminating lens system, comprising:
an illuminating lens, comprising an inner cavity surface with a downward opening and an outer surface;
a lens holder provided at the bottom of the illuminating lens, wherein the lens holder is provided with a through hole communicating with the inner cavity surface, and the through hole is in smooth transition with the inner cavity surface; and
a plurality of support legs provided at the bottom of the lens holder;

wherein projections of the highest points of the outer surface and the inner cavity surface of the illuminating lens on the horizontal plane are overlapped, and in a rectangular coordinate system, a horizontal profile curve of the outer surface and the inner cavity surface of the illuminating lens obtained from arbitrary height satisfies the following equation:

$$\left(\frac{|x_i|}{a_i}\right)^{n_i} + \left(\frac{|y_i|}{b_i}\right)^{n_i} = 1$$

where ai is the projection length of a portion of an xz section basic profile curve, which is intercepted by an xiyi plane, on the xiyi plane; bi is the projection length of a portion of a yz basic profile curve, which is intercepted by the xiyi plane, on the xiyi plane; xi, yi are coordinates of certain point on the outer horizontal profile curve and the inner horizontal profile curve; ni is a real number greater than 1.

\* \* \* \* \*